US010002527B2

(12) United States Patent
Gao

(10) Patent No.: US 10,002,527 B2
(45) Date of Patent: Jun. 19, 2018

(54) REMOTE CONTROL MOBILE TERMINAL, REMOTE CONTROL SYSTEM AND REMOTE CONTROL METHOD

(71) Applicant: ZTE CORPORATION, Guangdong (CN)

(72) Inventor: Honghua Gao, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days. days.

(21) Appl. No.: 15/504,520

(22) PCT Filed: Aug. 5, 2015

(86) PCT No.: PCT/CN2015/086166
§ 371 (c)(1),
(2) Date: Feb. 16, 2017

(87) PCT Pub. No.: WO2016/026387
PCT Pub. Date: Feb. 25, 2016

(65) Prior Publication Data
US 2017/0236409 A1 Aug. 17, 2017

(30) Foreign Application Priority Data
Aug. 20, 2014 (CN) .......................... 2014 1 0415144

(51) Int. Cl.
G08C 17/02 (2006.01)
G06F 3/16 (2006.01)

(52) U.S. Cl.
CPC ............. *G08C 17/02* (2013.01); *G06F 3/167* (2013.01); *G08C 2201/31* (2013.01)

(58) Field of Classification Search
CPC ...... G08C 17/02; G08C 2201/31; G06F 3/167
(Continued)

(56) References Cited

U.S. PATENT DOCUMENTS

2003/0076240 A1  4/2003  Bae et al.
2004/0002866 A1  1/2004  Deisher et al.
(Continued)

FOREIGN PATENT DOCUMENTS

CN    1725902 A    1/2006
CN    102647522 A   8/2012
CN    102905021 A   1/2013

OTHER PUBLICATIONS

International Search Report dated Oct. 29, 2015 issued in PCT/CN2015/086166.
(Continued)

Primary Examiner — Hirdepal Singh
(74) Attorney, Agent, or Firm — Scully Scott Murphy & Presser

(57) ABSTRACT

Disclosed in the present invention are a remote control mobile terminal, a remote control system and a remote control method. A voice recognition module and a remote control module are arranged in the remote control mobile terminal; and the method includes: completing pairing between the remote control module and a remote controlled object; receiving a voice control instruction inputted by a user, obtaining a corresponding remote control instruction according to the voice control instruction and sending the remote control instruction to the remote control module via the voice recognition module; and sending the remote control instruction to the remote controlled object via the remote control module to control the remote controlled object.

11 Claims, 3 Drawing Sheets

(58) Field of Classification Search
USPC .......................................................... 340/12.5
See application file for complete search history.

(56) References Cited

U.S. PATENT DOCUMENTS

| | | | | |
|---|---|---|---|---|
| 2005/0027539 | A1* | 2/2005 | Weber | G08C 17/00 704/275 |
| 2011/0119715 | A1 | 5/2011 | Chang et al. | |
| 2012/0215537 | A1* | 8/2012 | Igarashi | G06F 3/167 704/249 |
| 2015/0339098 | A1* | 11/2015 | Lee | G06F 3/167 715/728 |
| 2016/0125733 | A1* | 5/2016 | Sallas | G08C 23/04 398/106 |
| 2016/0182938 | A1* | 6/2016 | James | H04N 21/42203 704/275 |
| 2017/0154625 | A1* | 6/2017 | Heo | G10L 15/22 |

OTHER PUBLICATIONS

Supplementary European Search Report dated Jul. 27, 2017 issued in European Patent Application No. 15 83 4539.

* cited by examiner

REMOTE CONTROL MOBILE TERMINAL, REMOTE CONTROL SYSTEM AND REMOTE CONTROL METHOD

CROSS-REFERENCE TO RELATED APPLICATION

This application is the 371 application of PCT Application No. PCT/CN2015/086166, filed Aug. 5, 2015, which is based upon and claims priority to Chinese Patent Application No. 201410415144.3, filed Aug. 20, 2014, the entire contents of which are incorporated herein by reference.

TECHNICAL FIELD

The present disclosure relates to the field of communication, and more particularly, to a remote control mobile terminal, a remote control system and a remote control method.

BACKGROUND

With the improvement of people's material and cultural life, a variety of home appliances go into thousands of households. Among them, household appliances with remote control become more and more, and a variety of remote controls at home also become more and more (typically a TV remote control, an air conditioning remote control, a set-top box remote control, etc.), thereby daily storage, search and use of the remote controls are very inconvenient. If the remote control of an old model of the home appliance is lost, it is impossible to find a same remote control. Now, mobile communication terminals, such as mobile phones and PADs, are the most commonly used handheld communication devices by people, and everybody is used to carry the mobile phone and often keeps the mobile phone at hand. Therefore, many people want to use the mobile phone also as the remote control of the home appliance. Now, the hardware and software of a smart phone have been very strong, and a large-size touch screen may be designed into a controller having a variety of keyboard layouts. As long as there is a proper software to establish a standard appliance wireless adaptation protocol, the smart phone can be used as a universal remote control of the household appliances. However, even if the above-mentioned problems are solved, the conventional manual remote control method still has deficiencies.

For example, when watching TV, the user suddenly wants to see "Hunan Satellite TV", but he/she does not know the channel number of Hunan Satellite TV. At this time, the process of the manual remote control is as follows: the user picks up the remote control to aim at the TV, and then continuously pluses or minuses the channel number, or the user calls up a program menu for query. Obviously, this operation is relatively cumbersome since there are generally one or two hundreds of channels. Further, if the user only knows the name of the program to be seen, such as "Where are we going, Dad?", and does not know the channel number, he/she can only tune out a more detailed program menu to query. There is also a problem that if the program desired to be seen has not yet broadcasted, and the user wants to fall back to the previous channel, because the existing remote control only supports switch between the last two channels, the user cannot return back to the previous channel, and only can find it channel by channel. For another example, when watching TV while eating, which everybody did, if you want to tune the channel, then you have to put down the bowl and chopsticks in your hands and pick up the remote control. In the case that things to eat are in the hand, the user needs to wash their hands first and then change the channel. It can be seen that the existing manual remote control method has the problems of inconvenient operation, low efficiency and poor satisfaction of user experience.

This section provides background information related to the present disclosure which is not necessarily prior art.

SUMMARY

The main technical problem to be solved by embodiments of the present disclosure is to provide a remote control mobile terminal, a remote control system and a remote control method, which at least solve the problems of inconvenient operation, low efficiency and poor satisfaction of the user experience in the existing manual remote control.

In order to at least solve the above technical problems, the embodiments of the present disclosure provide a remote control method of a remote control mobile terminal, the remote control mobile terminal including a remote control module and a voice recognition module, and the method including:

completing pairing between the remote control module and a remote controlled object;

receiving a voice control instruction inputted by a user, obtaining a corresponding remote control instruction according to the voice control instruction and sending the remote control instruction to the remote control module via the voice recognition module; and sending the remote control instruction to the remote controlled object via the remote control module to control the remote controlled object.

In an embodiment of the present disclosure, before completing pairing between the remote control module and the remote controlled object, the method further includes: receiving a voice remote control enabling instruction sent by the user and sending the voice remote control enabling instruction to the remote control module via the voice recognition module; and completing, via the remote control module, the pairing with the remote controlled object according to the voice remote control enabling instruction.

In an embodiment of the present disclosure, the method further includes: acquiring and storing, via an information acquisition module of the remote control mobile terminal, remote control codes corresponding to respective functions of the remote controlled object; and the obtaining the corresponding remote control instruction according to the voice control instruction via the voice recognition module includes:

when the voice control instruction is a function control instruction, searching for the remote control codes of the corresponding function according to the voice control instruction and generating the remote control instruction.

In an embodiment of the present disclosure, the remote controlled object is a multimedia terminal, and the method further includes: acquiring a program list of the remote controlled object; and the obtaining the corresponding remote control instruction according to the voice control instruction via the voice recognition module includes:

when the voice control instruction is a program switching instruction, searching for a corresponding program from the program list, and then generating the corresponding remote control instruction.

In an embodiment of the present disclosure, the program switching instruction is a channel tuning instruction or a program tuning instruction.

In order to at least solve the above technical problems, the embodiments of the present disclosure also provide a remote control mobile terminal, including a voice recognition module and a remote control module, the remote control module is configured to be paired with a remote controlled object, receive a remote control instruction sent by the voice recognition module, and send the remote control instruction to the remote controlled object to control the remote controlled object; and the voice recognition module is configured to receive a voice control instruction inputted by a user, obtain a corresponding remote control instruction according to the voice control instruction and send the corresponding remote control instruction to the remote control module.

In an embodiment of the present disclosure, the voice recognition module is further configured to, before the remote control module is paired with the remote controlled object, receive a voice remote control enabling instruction sent by the user and send the voice remote control enabling instruction to the remote control module; and the remote control module completes the pairing with the remote controlled object according to the voice remote control enabling instruction.

In an embodiment of the present disclosure, the remote control mobile terminal further includes an information acquisition module configured to acquire and store remote control codes corresponding to respective functions of the remote controlled object; and the voice recognition module obtains the corresponding remote control instruction according to the voice control instruction by:

when the voice control instruction is a function control instruction, searching for the remote control codes of the corresponding function according to the voice control instruction and generating the remote control instruction.

In an embodiment of the present disclosure, the remote controlled object is a multimedia terminal, and the remote control mobile terminal further includes an information acquisition module configured to acquire a program list of the remote controlled object; and the voice recognition module obtains the corresponding remote control instruction according to the voice control instruction by:

when the voice control instruction is a program switching instruction, searching for a corresponding program from the program list, and generating the corresponding remote control instruction.

In an embodiment of the present disclosure, the program switching instruction is a channel tuning instruction or a program tuning instruction.

In order to at least solve the above technical problems, the embodiments of the present disclosure also provide a remote control system, including a remote control mobile terminal and a remote controlled object;

the remote controlled object is configured to be paired with the remote control mobile terminal, and receive and respond to a remote control instruction from the remote control mobile terminal; and the remote control mobile terminal is configured to receive a voice control instruction inputted by a user, obtain a corresponding remote control instruction according to the voice control instruction and send the remote control instruction to the remote controlled object to control the remote controlled object.

In order to at least solve the above technical problems, the embodiments of the present disclosure also provide a computer storage medium, wherein the computer storage medium is stored with a computer-executable instruction, and the computer-executable instruction is configured to:

complete pairing between the remote control module and a remote controlled object;

receive a voice control instruction inputted by a user, obtain a corresponding remote control instruction according to the voice control instruction and send the remote control instruction to the remote control module via the voice recognition module; and send the remote control instruction to the remote controlled object via the remote control module to control the remote controlled object.

The advantageous effects of the embodiments of the present disclosure are as follows.

In the remote control mobile terminal, the remote control system and the remote control method provided by the embodiments of the present disclosure, the voice recognition module and the remote control module are arranged in the remote control mobile terminal; the voice recognition module receives the voice control instruction inputted by the user, obtains the corresponding remote control instruction according to the voice control instruction and sends it to the remote control module; and the remote control module sends the remote control instruction to the remote controlled object (such as an air conditioner, a TV, a set-top box, etc.) to control the remote controlled object. It can be seen that the solution provided by the embodiments of the present disclosure can realize the voice remote control on the remote controlled object by the remote control mobile terminal without the manual remote control by the user. When the manual operation is inconvenient, the user can realize the remote control by voice, which can promote the convenience of remote control operation. Meanwhile, due to the direct voice remote control, the user can directly switch among individual programs through voice instructions without switching and searching program by program or channel by channel, which can improve the efficiency of remote control to a greater extent, thereby enhancing the satisfaction degree of user experience.

This section provides a summary of various implementations or examples of the technology described in the disclosure, and is not a comprehensive disclosure of the full scope or all features of the disclosed technology.

DETAILED DESCRIPTION

Hereinafter, the present disclosure would be explained in detail by the specific embodiments in combination with the drawings.

Figure 1:
FIG. 1 is a schematic structural view of a remote control system according to a first embodiment of the present disclosure.

First Embodiment:

As shown in FIG. 1, the remote control system provided by the present embodiment includes a remote control mobile terminal and a remote controlled object; the remote control mobile terminal may be a mobile phone terminal, a tablet computer (PAD), an electronic dictionary, or the like; and the remote controlled object may be an air conditioner, a television, a refrigerator, a fan with a remote control function and so on.

The remote controlled object is configured to complete pairing with the remote control mobile terminal, and receives and responds to a remote control instruction from the remote control mobile terminal. For example, when the remote controlled object is the air conditioner, the remote controlled object receives a thermoregulation remote control instruction sent by the remote control mobile terminal and adjusts the temperature according to the instruction (i.e. responds to the remote control instruction).

The remote control mobile terminal is configured to receive a voice control instruction inputted by the user, generates a corresponding remote control instruction according to the voice control instruction and sends the remote control instruction to the remote controlled object to control the remote controlled object.

It can be seen that this embodiment can realize the remote control of the remote controlled object by the remote control mobile terminal without the manual remote control operation by the user. When it is inconvenient for the user to perform the manual operation, the remote control can be realized by voice, which can improve the convenience of remote control operation.

Figure 2:
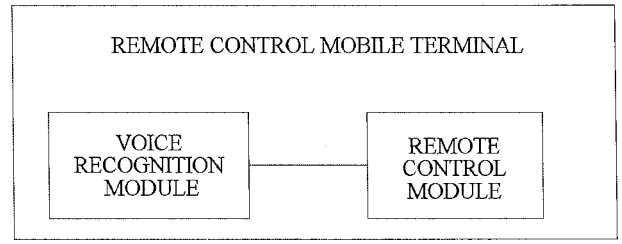
FIG. 2 is a schematic diagram of a remote control mobile terminal according to the first embodiment of the present disclosure.

Referring to FIG. 2, the remote control mobile terminal in the present embodiment includes a voice recognition module and a remote control module.

The voice recognition module is configured to receive a voice control instruction inputted by a user, obtain a corresponding remote control instruction according to the voice control instruction and send it to the remote control module.

The remote control module is configured to be paired with the remote controlled object, receive the remote control instruction sent by the voice recognition module, and send the remote control instruction to the remote controlled object to control the remote controlled object. In this embodiment, the remote control module can transmit the remote control instruction to the remote controlled object through wireless communication, such as infrared communication or near field communication.

The voice recognition module may also be configured to receive a voice remote control enabling instruction sent by the user before the remote control module and the remote controlled object are paired, and send the voice remote control enabling instruction to the remote control module.

The remote control module completes the pairing with the remote controlled object according to the voice remote control enabling instruction; if the pairing succeeds, the remote control module feedbacks a pairing success prompt to the user, and if the pairing fails, the remote control module feedbacks a pairing failure prompt to the user.

Figure 3:
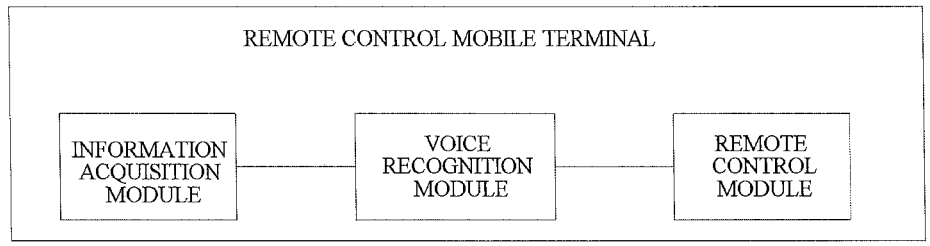
FIG. 3 is a schematic diagram of another remote control mobile terminal according to the first embodiment of the present disclosure.

Referring to FIG. 3, the remote control mobile terminal in this embodiment further includes an information acquisition module for acquiring and storing remote control codes corresponding to individual functions of the remote controlled object. The information acquisition module in the present embodiment may acquire the remote control codes corresponding to individual functions of a plurality of remote controlled objects (for example, the remote control codes corresponding to individual functions of the remote controlled objects such as a TV, a refrigerator, an air conditioner, a set-top box, etc. in a home), and may store the remote control codes in the remote control mobile terminal locally in terms of different remote controlled objects. When the remote controlled object in this embodiment is a multimedia terminal (e.g., a TV, and a set-top box), the information acquisition module may also be used to acquire (via WiFi, Bluetooth, etc.) and store a program list of the remote controlled object. The program list may include TV stations in which respective programs broadcast, channel numbers corresponding to respective TV stations, and the like. Correspondingly, the voice control instruction in the present embodiment may be a function control instruction or a program switching instruction. The function control instruction herein refers to controlling a response function of the remote controlled object, for example, a tempering function, a wind regulation function, a sleep function, a display function and so on of the air conditioning; for another example, a volume change function, a brightness adjustment function, a sleep function and so on of the TV. The program switching instruction is mainly directed to the multimedia terminal, such as a television or a set-top box, etc., and is mainly used to achieve the program switch.

The voice recognition module obtains the corresponding remote control instruction according to the voice control instruction inputted by the user by using the following manner.

When the voice control instruction is a function control instruction, the remote control codes of the corresponding function are searched out according to the voice control instruction from the stored remote control code list corresponding to each function of the remote controlled object, and then the remote control instruction is generated.

When the voice control instruction is a program switching instruction, the program which is requested to be switched by the voice control instruction is found from the stored program list, and then a corresponding remote control instruction including information of the channel of the program is generated. The program switching instruction in the present embodiment may be a channel-tuning instruction issued by the user, such as a voice instruction "Shenzhen TV Station" inputted by the user; or the program switching instruction may be a program-tuning instruction issued by the user, such as a voice instruction "CCTV news" inputted by the user. The voice recognition module, after generating the corresponding remote control instruction according to the program switching instruction, sends the remote control instruction to the remote controlled object through the remote control module, and the remote controlled object directly switches to the corresponding program in response to the remote control instruction without searching or switching program by program or channel by channel by the user. For example, it is supposed that the TV is currently in "Hunan Satellite TV" and is playing the program "Where are we going, Dad?", when the user inputs the voice control instruction "Shenzhen TV Station", the corresponding channel information is found in the stored program list according to the voice control instruction, then a remote control instruction is generated and transmitted to the TV through the infrared, and then the TV directly switches to the Shenzhen TV Station after receiving the instruction.

Therefore, the solution provided by the present embodiment can completely liberate the user's hands and greatly improve the input efficiency of the user without interrupting the current activity of the user. In particular, when tuning the channels, the user no longer has to remember the TV stations corresponding to the channel numbers, and can directly tune the channels by speaking the station name (channel name) or the program name, which greatly improves the efficiency of channel-tuning. Without increasing the cost of hardware, the user experience of remote control is enhanced.

It is to be noted that in addition to the voice remote control function described above, the remote control mobile terminal in the present embodiment can also have the conventional manual remote control function. The user can use both functions at the same time, or switch between these two functions at any time. This setting can meet the individual needs of different users, and can further enhance the satisfaction degree of the user experience.

Figure 4:
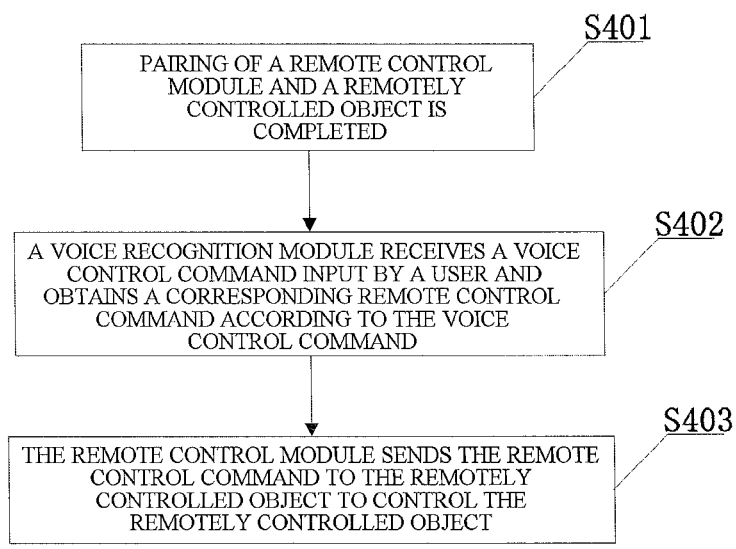
FIG. 4 is a flowchart of a remote control method of a remote control mobile terminal according to a second embodiment of the present disclosure.

Second Embodiment:

Referring to FIG. 4, the remote control method of the remote control mobile terminal provided by the present embodiment includes the following steps.

In step 401, the remote control module completes pairing with the remote controlled object; if the pairing succeeds, the remote control module feedbacks a pairing success prompt to the user; and if the pairing fails, the remote control module feedbacks a pairing failure prompt to the user.

In step 402, the voice recognition module receives a voice control instruction inputted by the user, obtains a corresponding remote control instruction according to the voice control instruction and sends it to the remote control module.

In step 403, the remote control module sends the remote control instruction to the remote controlled object to control the remote controlled object. In this embodiment, the remote control module may transmit the remote control instruction to the remote controlled object through wireless communication such as infrared communication or near field communication.

In the embodiment, the method further includes: before the remote control module and the remote controlled object are paired, the voice recognition module receives a voice remote control enabling instruction sent by the user and sends it to the remote control module: and the remote control module can complete pairing with the remote controlled object according to the voice remote control enabling instruction.

The information acquisition module in the remote control mobile terminal in this embodiment is further configured to acquire and store remote control codes corresponding to individual functions of the remote controlled object. The information acquisition module in the present embodiment may acquire the remote control codes corresponding to individual functions of a plurality of remote controlled objects (for example, the remote control codes corresponding to individual functions of the remote controlled objects such as a TV, a refrigerator, an air conditioner, a set-top box, etc. in a home), and may store the remote control codes in the remote control mobile terminal locally in terms of different remote controlled objects. When the remote controlled object in this embodiment is a multimedia terminal (e.g., a TV, and a set-top box), the information acquisition module may also be used to acquire (via WiFi. Bluetooth, etc.) and store a program list of the remote controlled object. The program list may include TV stations in which respective programs broadcast, channel numbers corresponding to respective TV stations, and the like. Correspondingly, the voice control instruction in the present embodiment may be a function control instruction or a program switching instruction. The function control instruction herein refers to controlling a response function of the remote controlled object, for example, a tempering function, a wind regulation function, a sleep function, a display function and so on of the air conditioning; for another example, a volume change function, a brightness adjustment function, a sleep function and so on of the TV. The program switching instruction is mainly directed to the multimedia terminal, such as a television or a set-top box, etc., and is mainly used to achieve the program switch.

The voice recognition module obtains the corresponding remote control instruction according to the voice control instruction inputted by the user by using the following manner.

When the voice control instruction is a function control instruction, the remote control codes of the corresponding function are searched out according to the voice control instruction from the stored remote control code list corresponding to each function of the remote controlled object, and then the remote control instruction is generated.

When the voice control instruction is a program switching instruction, the program which is requested to be switched by the voice control instruction is found from the stored program list, and then a corresponding remote control instruction including information of the channel of the program is generated. The program switching instruction in the present embodiment may be a channel-tuning instruction issued by the user, such as a voice instruction "Shenzhen TV Station" inputted by the user; or the program switching instruction may be a program-tuning instruction issued by the user, such as a voice instruction "CCTV news" inputted by the user. The voice recognition module, after generating the corresponding remote control instruction according to the program switching instruction, sends the remote control instruction to the remote controlled object through the remote control module, and the remote controlled object directly switches to the corresponding program in response to the remote control instruction without searching or switching program by program or channel by channel by the user. For example, it is supposed that the TV is currently in "Hunan Satellite TV" and is playing the program "Where are we going. Dad?", when the user inputs the voice control instruction "Open the doors", the corresponding program and information of the channel of the program are found in the stored program list according to the voice control instruction, then a remote control instruction is generated and transmitted to the TV through the infrared, and then the TV directly switches to the "Open the doors" program in CCTV 2 after receiving the instruction.

In addition to the voice remote control function described above, the remote control mobile terminal in the present embodiment can also have the conventional manual remote control function. The user can use both functions at the same time, or switch between these two functions at any time. This setting can meet the individual needs of different users, and can further enhance the satisfaction degree of the user experience.

The solution provided by the present embodiment can completely liberate the user's hands and greatly improve the input efficiency of the user without interrupting the current activity of the user. In particular, when tuning the channels, the user no longer has to remember the TV stations corresponding to the channel numbers, and can directly tune the channels by speaking the station name or the program name, which greatly improves the efficiency of channel-tuning. Without increasing the cost of hardware, the user experience of remote control is enhanced.

Third Embodiment:

In order to better understand the present disclosure, the present disclosure is further illustrated by using a smart phone as the remote control mobile terminal, and using a TV as the remote controlled object, in which two cases of performing a program switching by issuing a program switching instruction and performing a function control by issuing a function control instruction are illustrated respectively.

Figure 5:
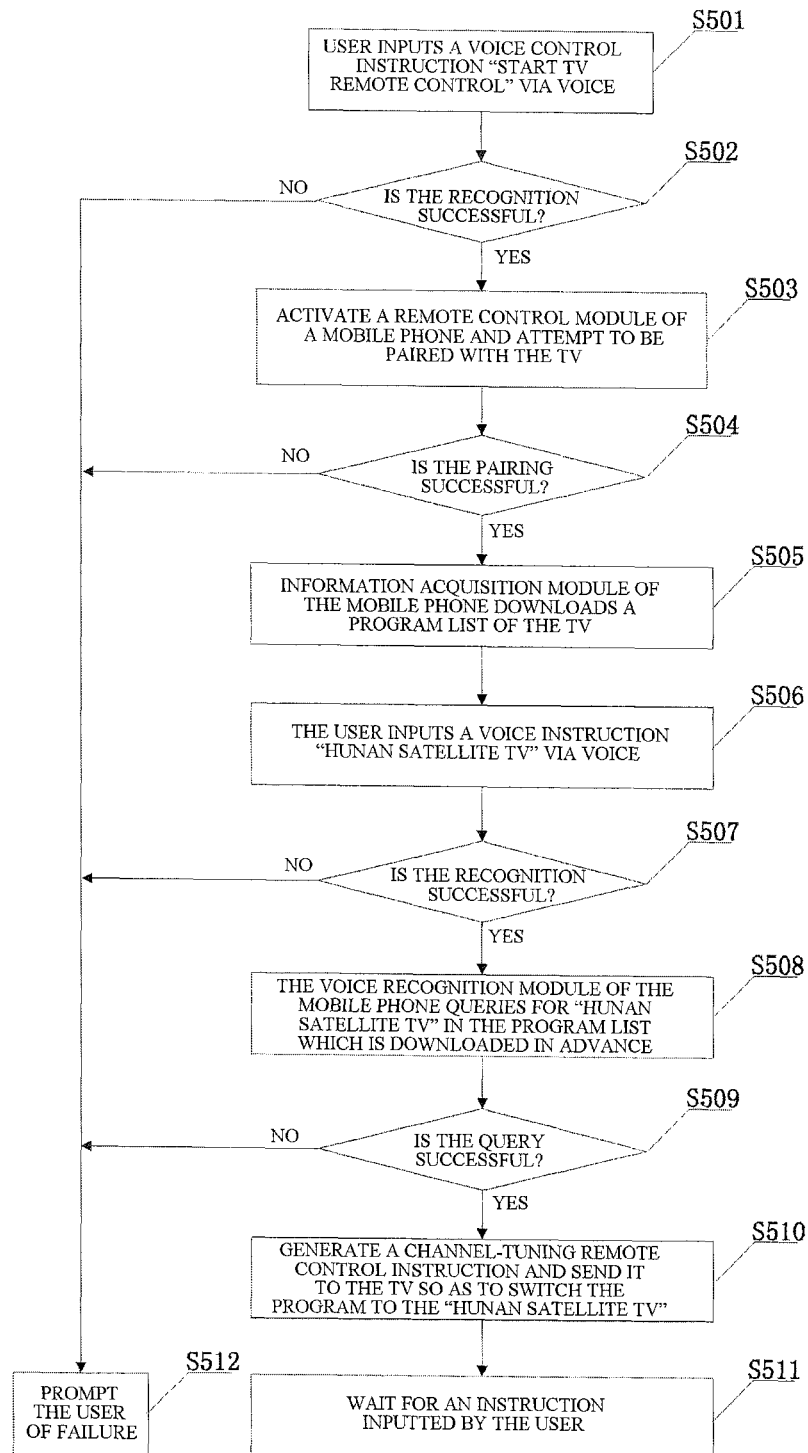
FIG. 5 is a flowchart of a procedure of switching programs by remote control via a mobile phone according to a third embodiment of the present disclosure.

Referring to FIG. 5, the process of switching a program by issuing a program switching instruction includes the following steps.

In step 501, a voice control instruction "Start TV remote control" is inputted by a user via voice.

In step 502, a voice recognition module in a mobile phone recognizes the voice control instruction and determines whether the recognition is successful. If yes, the process goes to step 503; otherwise, the process goes to step 512.

In step 503, the remote control module of the mobile phone is activated and attempted to be paired with the TV.

In step 504, it is determined whether the pairing is successful; if yes, the process goes to step 505; otherwise, the process goes to step 512.

In step 505, an information acquisition module of the mobile phone downloads a program list of the TV, and then prompts the user that the activation is successful after the download is completed.

In step 506, a voice instruction "Hunan Satellite TV" is inputted by the user via voice.

In step 507, the voice recognition module of the mobile phone recognizes the input voice instruction, and determines whether the recognition is successful. If yes, the process proceeds to step 508: otherwise, the process goes to step 512.

In step 508, the voice recognition module of the mobile phone queries for "Hunan Satellite TV" from the program list which is downloaded in advance.

In step 509, it is determined whether the query is successful; if yes, the process goes to step 510; otherwise, the process goes to step 512.

In step 510, when a remote control instruction for tuning channels is generated by pairing, the remote control module sends the remote control instruction to the TV so as to switch the program to the "Hunan Satellite TV".

In step 511, the user input is waited for.

In step 512, the user is prompted of a failure; and is further prompted to re-enter.

The above is a description of the embodiment of the present disclosure in a scenario of tuning channels of TV. Obviously, the scenario may be replaced by any other scenarios using the remote control, such as a scene of cooling by remotely controlling an air conditioner, which will not be elaborated herein.

Figure 6:
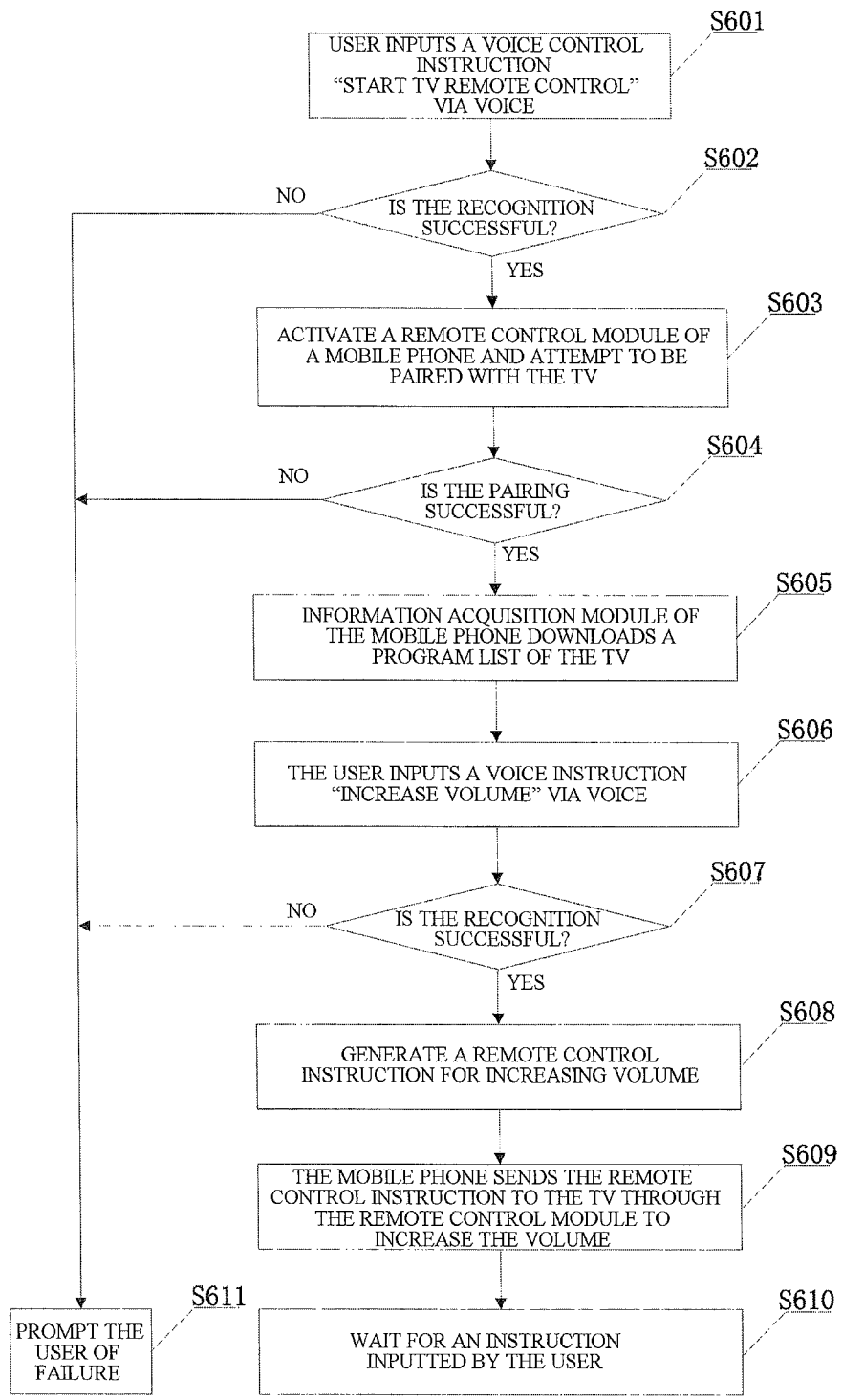
FIG. 6 is a flowchart of a procedure of controlling a volume by remote control via the mobile phone according to the third embodiment of the present disclosure.

Referring to FIG. 6, the process of controlling a volume by issuing a function control instruction for increasing volume includes the following steps.

In step 601, a voice control instruction "Start TV remote control" is inputted by a user via voice.

In step 602, a voice recognition module of a mobile phone recognizes the voice control instruction and determines whether the recognition is successful. If yes, the process goes to step 603; otherwise, the process proceeds to step 611.

In step 603, a remote control module of the mobile phone is activated and attempted to be paired with the TV.

In step 604, it is determined whether the pairing is successful; if yes, the process goes to step 605; otherwise, the process goes to step 611.

In step 605, an information acquisition module of the mobile phone downloads a program list of the TV, and then may prompt the user that the activation is successful after the download is completed.

In step 606, a voice instruction "Increase volume" is inputted by the user via voice.

In step 607, the voice recognition module of the mobile phone recognizes the input voice instruction and determines whether the recognition is successful. If yes, the process goes to step 608; otherwise, the process goes to step 611.

In step 608, the voice recognition module of the mobile phone finds remote control codes for increasing volume from the function remote control code list stored in advance and generates the remote control instruction for increasing volume.

In step 609, the mobile phone sends the remote control instruction to the TV through the remote control module to increase volume.

In step 610, the user input is waited for.

In step 611, the user is prompted of a failure; and may be further prompted to re-enter.

It can be seen that the solution provided by the embodiments of the present disclosure can realize the voice remote control over the remote controlled object at the remote control mobile terminal, without the manual remote control by the user. When the manual operation is inconvenient, the user can realize the remote control by voice, which can promote the convenience of remote control operation. Meanwhile, due to the direct voice remote control, the user can directly switch among individual programs through voice instructions without switching and searching program by program or channel by channel, which can improve the efficiency of remote control to a greater extent, thereby enhancing the satisfaction degree of user experience.

The above contents are further detailed explanations of the present disclosure in combination with specific embodiments, and it is not to be construed that the specific implementations of the present disclosure are limited to these explanations. It should be noted that for the person skilled in the art, it is possible to make several deductions or substitutions without departing from the principle of the present disclosure, and these deductions or substitutions also fall within the protection scope of the present disclosure.

INDUSTRIAL APPLICABILITY

From above, the embodiments of the present disclosure provide a remote control mobile terminal, a remote control system and a remote control method, which have the following advantageous effects. The problems of inconvenient operation, low efficiency and poor satisfaction of the user experience in the existing manual remote control are solved. In addition, the voice recognition module and the remote control module are arranged in the remote control mobile terminal; the voice recognition module receives the voice control instruction inputted by the user, obtains the corresponding remote control instruction according to the voice control instruction and sends it to the remote control module; and the remote control module sends the remote control instruction to the remote controlled object (such as an air conditioner, a TV, a set-top box, etc.) to control the remote controlled object. It can be seen that the solution provided by the embodiments of the present disclosure can realize the voice remote control on the remote controlled object by the remote control mobile terminal without the manual remote control by the user. When the manual operation is inconvenient, the user can realize the remote control by voice, which can promote the convenience of remote control operation. Meanwhile, due to the direct voice remote control, the user can directly switch among individual programs through voice instructions without switching and searching program by program or channel by channel, which can improve the efficiency of remote control to a greater extent, thereby enhancing the satisfaction degree of user experience.

What is claimed is:

1. A remote control method of a remote control mobile terminal, the remote control mobile terminal comprising a remote control module and a voice recognition module, and the method comprising:

completing pairing between the remote control module and a remote controlled object;

receiving a voice control instruction inputted by a user, obtaining a corresponding remote control instruction according to the voice control instruction and sending the remote control instruction to the remote control module via the voice recognition module; and sending the remote control instruction to the remote controlled object via the remote control module to control the remote controlled object, wherein the remote control method of the remote control mobile terminal further comprises:

acquiring and storing, via an information acquisition module of the remote control mobile terminal, remote control codes corresponding to respective functions of the remote controlled object; and the obtaining the corresponding remote control instruction according to the voice control instruction via the voice recognition module comprising: when the voice control instruction is a function control instruction, searching for the remote control codes of the corresponding function according to the voice control instruction and generating the remote control instruction, wherein before completing pairing between the remote control module and the remote controlled object, the method further comprises: receiving a voice remote control enabling instruction sent by the user and sending the voice remote control enabling instruction to the remote control module via the voice recognition module; and completing, via the remote control module, the pairing with the remote controlled object according to the voice remote control enabling instruction.

2. The remote control method of the remote control mobile terminal according to claim 1, wherein the remote controlled object is a multimedia terminal, and the method further comprises: acquiring a program list of the remote controlled object; and the obtaining the corresponding remote control instruction according to the voice control instruction via the voice recognition module comprises:

when the voice control instruction is a program switching instruction, searching for a corresponding program from the program list, and then generating the corresponding remote control instruction.

3. The remote control method of the remote control mobile terminal according to claim 1, wherein the remote controlled object is a multimedia terminal, and the method further comprises: acquiring a program list of the remote controlled object; and the obtaining the corresponding remote control instruction according to the voice control instruction via the voice recognition module comprises:

when the voice control instruction is a program switching instruction, searching for a corresponding program from the program list, and then generating the corresponding remote control instruction.

4. The remote control method of the remote control mobile terminal according to claim 2, wherein the program switching instruction is a channel tuning instruction or a program tuning instruction.

5. The remote control method of the remote control mobile terminal according to claim 3, wherein the program switching instruction is a channel tuning instruction or a program tuning instruction.

6. A remote control mobile terminal, comprising:

a processor; and a memory for storing instructions executable by the processor;

the processor is configured to:

pair the remote control mobile terminal with a remote controlled object, receive a remote control instruction, and send the remote control instruction to the remote controlled object to control the remote controlled object; and receive a voice control instruction inputted by a user, and obtain a corresponding remote control instruction according to the voice control instruction, wherein the processor is further configured to acquire and store remote control codes corresponding to respective functions of the remote controlled object; and wherein the corresponding remote control instruction is obtained according to the voice control instruction by, when the voice control instruction is a function control instruction, searching for the remote control code of the corresponding function according to the voice control instruction and generating the remote control instruction, wherein the processor is further configured to, before the remote control mobile terminal is paired with the remote controlled object, receive a voice remote control enabling instruction sent by the user; and complete the pairing with the remote controlled object according to the voice remote control enabling instruction.

7. The remote control mobile terminal according to claim 6, wherein the remote controlled object is a multimedia terminal, and the processor is further configured to acquire a program list of the remote controlled object; and the corresponding remote control instruction is obtained according to the voice control instruction by:

when the voice control instruction is a program switching instruction, searching for a corresponding program from the program list, and generating the corresponding remote control instruction.

8. The remote control mobile terminal according to claim 6, wherein the remote controlled object is a multimedia terminal, and the processor is further configured to acquire a program list of the remote controlled object; and the corresponding remote control instruction is obtained according to the voice control instruction by:

when the voice control instruction is a program switching instruction, searching for a corresponding program from the program list, and generating the corresponding remote control instruction.

9. The remote control mobile terminal according to claim 7, wherein the program switching instruction is a channel tuning instruction or a program tuning instruction.

10. The remote control mobile terminal according to claim 8, wherein the program switching instruction is a channel tuning instruction or a program tuning instruction.

11. A remote control system, comprising a remote control mobile terminal and a remote controlled object;

the remote controlled object is configured to be paired with the remote control mobile terminal, and receive and respond to a remote control instruction from the remote control mobile terminal; and the remote control mobile terminal is configured to receive a voice control instruction inputted by a user, obtain a corresponding remote control instruction according to the voice control instruction and send the remote control instruction to the remote controlled object to control the remote controlled object, wherein the remote control mobile terminal is further configured to acquire and store remote control codes corresponding to respective functions of the remote controlled object; and wherein the corresponding remote control instruction is obtained according to the voice control instruction by, when the voice control instruction is a function control instruction, searching for the remote control code of the corresponding function according to the voice control instruction and generating the remote control instruction, wherein the remote control mobile terminal is further configured to, before the remote control mobile terminal is paired with the remote controlled object, receive a voice remote control enabling instruction sent by the user; and complete the pairing with the remote controlled object according to the voice remote control enabling instruction.

* * * * *